3,472,934
METHODS FOR PROMOTING GROWTH AND CONTROLLING DISEASE IN RUMINANT ANIMALS WITH A TETRACYCLINE ANTIBIOTIC AND SULFAMETHAZINE
James Joseph Drain, Lawrenceville, N.J., assignor to American Cyanamid Company, Stamford, Conn., a corporation of Maine
No Drawing. Continuation-in-part of application Ser. No. 457,798, May 21, 1965. This application Sept. 11, 1968, Ser. No. 759,214
Int. Cl. A61k 21/00
U.S. Cl. 424—227                    2 Claims

ABSTRACT OF THE DISCLOSURE

Composition of matter and method for promoting growth, controlling disease, and relieving the deleterious effects of stress in ruminant animals, such as calves. The composition comprising a medicated feed supplement for the fortification and improvement of standard, nutritionally-balanced feeds and designed to provide ruminant animals with an optimum dosage of a combination of a tetracycline antibiotic and sulfamethazine. The feed supplement also containing crude protein and other edible animal feedstuffs.

---

This application is a continuation-in-part of my co-pending application, Ser. No. 457,798, filed May 21, 1965, now abandoned.

This invention relates to a new and improved composition and method for promoting growth, inhibiting and controlling disease, and combating and relieving the deleterious effects of stress in ruminant animals. More particularly, this invention relates to a new and improved medicated feed supplement composition and method for administering an optimum dosage of a combination of a tetracycline antibiotic and sulfamethazine, to yield the combined results of growth promotion, disease control, and stress alleviation in ruminant animals, particularly young cattle. By this invention these results can be achieved both efficiently and inexpensively.

Disease outbreaks in ruminant animals, such as, cattle, sheep, and goats, following stresses imposed by shipping and handling are major problems in the ruminant animal industry. Many attempts have been made, especially in the field of veterinary medicine, to provide simple, convenient and effective means for overcoming these difficulties but to date no entirely satisfactory solution has been provided. Regardless of precautions taken, diseases, such as, shipping fever, pneumonia, respiratory infections, and similar diseases, frequently develop in ruminant animals subjected to stress conditions.

For example, cattle introduced into feed yards following long-distance shipment are subject to disease and other problems that cause them to start growth slowly. In many cases, three (3) weeks to a month elapse before the animals regain their purchase weights. One of the most troublesome and difficult conditions that develops is known as "shipping fever." Shipping fever is generally characterized as a respiratory ailment and makes serious inroads into the profitability of cattle operations. Thus, annual economic losses estimated by the U.S. Department of Agriculture approach $25 million or 0.72% of total production. These losses are the direct result of reduced weight gains, high mortality, expensive treatment, and delayed marketing.

Shipping fever occurs in cattle of both sexes, usually at from six (6) to twenty-four (24) months of age. The incidence of the disease is greatest during late autumn and winter, and it normally develops within ten (10) days after the cattle arrive at the feedlots. The disease is found in all major cattle producing countries. It appears to be of a complex nature and may be caused by *Pasteurella hemolytica* and/or *Pasteurella multocida*, a parainfluenza virus, and environmental stresses.

Environmental stresses that contribute to shipping fever include prolonged and exhausting transportation by truck or train, exposure to inclement weather, handling, sorting, weaning, dehorning, castration, and vaccination. During transit, the animals are typically crowded, frightened, and sometimes inadequately fed. Also, susceptible animals are exposed to disease causative organisms as they pass through stockyards and other collection points, where large numbers of cattle are present. It is believed that severe and shocking changes to which the animals are exposed increase their susceptibility to bacteria and viruses that affect the entire respiratory system.

To ensure profitable operation of feedlots, precautions must be taken to avoid, or restrict as much as possible, the incidence of shipping fever. Upon arrival at feedlots, the cattle must be carefully fed and handled so that they may recover from the rigors of transit. If an animal does contract shipping fever, it must be kept comfortable and protected from inclement weather, especially during periods of treatment and convalescence.

The presently established system practiced for preventing shipping fever uses immunizing agents. This system, however, is not completely effective, and it is a new and beneficial result of the feed supplements of the present invention that they can be used in combination with the previously known system of using immunizing agents to produce results far superior to those obtainable in the past.

When an immunizing agent is used, it is administered in several doses a few weeks in advance of shipment, and the antiserum is given just prior to shipment. These immunizing agents, especially the bacterins, when administered in the feedlot, may increase the incidence and seriousness of shipping fever and consequently their use at this stage should be avoided. The frequent ineffectiveness of immunizing agents may be due in part to the infeasibility of recommended methods of use. It may not be possible to administer the bacterin in an adequate number of doses sufficiently in advance of shipment. If used, a vaccine should contain both bacterial and viral antigens, since shipping fever is caused by multiple factors.

With the feed supplements of the present invention it is, however, possible to enhance disease preventive capacity of the immunizing agents, when a combination of the feed supplements and immunizing agents is used. Moreover, it has been found that use of the feed supplements of this invention, when no immunizing agents are used, produces distinctly superior disease preventive results than can be secured by the use of the immunizing agents alone.

It is, accordingly, a primary object of this invention to provide new and improved compositions and methods for promoting growth, controlling disease outbreaks, and relieving the deleterious effects of stress conditions in ruminant animals.

A further object of this invention is to provide new and improved feed supplement compositions and methods for the prevention of debilitating diseases affecting ruminant animals, particularly cattle, and for the simultaneous inducement of growth acceleration in the animals.

In accordance with this invention, the aforementioned desirable objectives may be obtained, rather surprisingly, by administering to the animal a feed supplement containing, preferably, about 17% or more by weight of crude protein, between about 350 and 11,200 grams per ton (g./ton) of supplement of a tetracycline antibiotic selected from the group consisting of tetracycline, chlortetracycline, oxytetracycline, and demethylchlortetracycline, and between about 350 and 11,200 g./ton of supplement of sulfamethazine. The supplement is designed for administration at the rate of from 1/16 lb. to 2 lbs./head/day depending on the concentration of the drugs.

I have discovered that when the supplement is administered in an amount sufficient to furnish approximately 350 mg./head/day of the tetracycline antibiotic and 350 mg./head/day of sulfamethazine, a significant response is achieved which is unobtainable with the individual drugs or with other combinations of the drugs administered at substantially higher or lower levels.

Additional objects and advantages of this invention will be set forth in part in the description that follows, and in part will be obvious from the description, or may be learned by practice of the invention, the objects and advantages being realized and attained by means of the compositions, methods, and improvements particularly pointed out in the appended claims.

To achieve the foregoing objects and in accordance with its purposes, this invention provides as a new composition of matter a feed supplement for administration to ruminant animals comprising, together with edible animal feedstuffs, sulfamethazine and a tetracycline antibiotic selected from the group consisting of tetracycline, chlorotetracycline, oxytetracycline, and demethylchlortetracycline, said supplement being designed for administration to the ruminant animals in an amount sufficient to furnish approximately 350 mg./head/day of sulfamethazine and approximately 350 mg./head/day of a tetracycline antibiotic. Preferably, the edible animal feedstuffs include a substantial amount of crude protein.

To further achieve the foregoing objects and in accordance with its purpose, this invention provides a method of promoting growth and controlling the outbreak of disease in ruminant animals comprising administering to said animals a feed supplement composition comprising together with edible animal feedstuffs, sulfamethazine, and a tetracycline antibiotic selected from the group consisting of tetracycline, chlorotetracycline, oxytetracycline, and demethylchlortetracycline, in an amount sufficient to furnish approximately 350 mg./head/day of sulfamethazine and approximately 350 mg./head/day of tetracycline antibiotic.

As used in the specification and claims, the expression "a tetracycline antibiotic" not only includes pure or free tetracycline, chlortetracycline, oxytetracycline, and demethylchlortetracycline, but also their antibiotically active derivatives which can also be used in the present invention. Such derivatives include calcium chloride combination products, hydrochlorides, sodium and potassium salts, quaternary ammonium salts, and the like.

It will be understood that in making up the feed supplements of this invention concentrations of the drugs will occasionally result that are slightly higher or lower than those desired to achieve the preferred or optimum dosage of each drug, i.e., 350 mg./day/head each of sulfamethazine and a tetracycline antibiotic. The Food and Drug Administration (FDA) has recognized this problem by establishing official tolerances, or control limits, for the drugs we are principally concerned with here, when these drugs are used in animal feed supplements. These tolerances give feed manufacturers some latitude in making up the feed supplement compositions of this invention. Thus, for example, the drug tolerance limits established with the FDA for chlortetracycline and oxytetracycline are plus or minus 30 percent and the limits for sulfamethazine are plus or minus 20 percent. Boyd, Industry's Goals, 1968 Feed Additive Compendium, pp. 11–12.

To provide for these tolerance limits the dosage of sulfamethazine and a tetracycline antibiotic are prescribed in the specification and claims as "approximately" 350 mg./head/day.

In situations where it is important to provide medicated feed supplements to animals located a considerable distance from convenient transportation, it has been found most practical to employ minimum amounts of supplement containing high levels of protein and drugs. In such situations the drug level per ton of supplement must be properly adjusted to obtain the desired response, but this is a relatively simple matter, and the drug concentrations can be readily determined from the following table in terms of grams of drugs per ton of supplement:

|  | Grams per ton of supplement | |
|---|---|---|
|  | Chlortetracycline | Sulfamethazine |
| Rate of Supplement/head/day: | | |
| 2.0 lbs | 350 | 350 |
| 1.0 lbs | 700 | 700 |
| ½ lb | 1,400 | 1,400 |
| ¼ lb | 2,800 | 2,800 |
| ⅛ lb | 5,600 | 5,600 |
| 1/16 lb | 11,200 | 11,200 |

Or in terms of milligrams of drugs per pound of supplement:

|  | Mg. per lb. of supplement | |
|---|---|---|
|  | Chlortetracycline | Sulfamethazine |
| Rate of Supplement/head/day: | | |
| 2.0 lbs | 175 | 175 |
| 1.0 lbs | 350 | 350 |
| ½ lb | 700 | 700 |
| ¼ lb | 1,400 | 1,400 |
| ⅛ lb | 2,800 | 2,800 |
| 1/16 lb | 5,600 | 5,600 |

Less than about 1/16 pound per head per day of supplement is impractical since it will not be sufficient to ensure optimum drug intake under practical management conditions.

With proper administration of the novel compositions of this invention, deleterious effects of stress as, for example, the depression in weight gains and loss of feed efficiency and disease outbreaks are avoided.

In accordance with the invention, it has been discovered that a superior and synergistic result is obtained when ruminant animals are fed with a combination of approximately 350 mg./head/day of sulfamethazine and approximately 350 mg./head/day of a tetracycline antibiotic. As pointed out above, this superior and synergistic result obtained with the combination of these two drugs at these particular dosage levels can not be secured either by using the individual drugs alone or by using combinations of the two drugs administered at substantially higher or lower levels than the approximately 350 mg./head/day taught by the invention.

The combination of the two drugs, sulfamethazine and a tetracycline, offers broader protection against disease than can be secured by either of the drugs alone, and at the dosage levels taught by this invention unexpected superior results are obtained.

The new and useful result of this invention is not predictable from the teachings of the prior art to the effect that similar combinations of drugs can be effectively administered to non-ruminant animals, such as pigs and poultry.

In the prior art disclosing administration of combinations of sulfamethazine and tetracycline to pigs and chickens, there are at least two significant and important differences from the present invention:

(1) The best results are obtained with pigs and chickens when sulfamethazine and tetracycline are administered in combination with penicillin. Penicillin, however, has been found to have a deleterious effect on growth promotion in cattle, and in fact, has the opposite effect. In a number of experiments and tests that have been conducted, it has been found that oral penicillin actually depresses the growth of cattle, even though its administration may be indicated for treatment of a specific condition contracted by the cattle, such as bloat.

(2) The acceptable range of dosage of drug supplements contained in animal feeds for pigs and chickens has been determined to be a broad one and excellent results can rather uniformly be obtained over this broad range. It has been discovered in the present invention, however, that this broad dosage range does not work with cattle, where a relatively narrow dosage level of approximately 350 mg./head/day of each drug, sulfamethazine and a tetracycline antibiotic, has been found to produce a distinctly superior result to other or broader dosage levels.

The feed supplement compositions of this invention provide broad protection against the diseases to which cattle in feedlots are typically subjected, particularly shipping fever. Shipping fever has been an elusive disease to prevent in cattle, but the economic losses it causes annually are tremendous. It is an unexpected beneficial result of this invention that, by administering feed supplement compositions at the relatively low levels taught by the invention, it is possible both to prevent outbreaks of shipping fever that would otherwise be expected to occur and at the same time to promote the growth of cattle well beyond what is attainable without administration of the new compositions. Once a calf has become diseased, it has been normal veterinary practice to administer dosages of sulfamethazine in quantities from 30 to 60 times greater than the relatively low level dosage taught by this invention.

In the prior art difficulties with administering sulfamethazine alone have been encountered, because the bacteria or disease agents against which sulfamethazine is initially effective tend to develop resistant strains when sulfamethazine alone is repeatedly used for therapy. Fortunately, with the unique combination of drugs and dosages taught by this invention, however, the problem of development of bacterial strains resistant to sulfamethazine is overcome.

The combination of the two drugs, sulfamethazine and a tetracycline antibiotic, offers much better disease control and a broader spectrum of protection against disease than can be secured by the use of either drug alone. Also, by using the two drugs together, effective disease prevention can be maintained at a lower cost. Thus, the amounts of both the tetracycline and sulfamethazine administered can be greatly reduced from the amounts of either drug alone that would be required to give the desired disease protection, and surprisingly, the growth promotion factor is enhanced at the low dosage levels of approximately 350 mg./head/day of each drug over growth response that can be attained at higher dosage levels—an unexpected beneficial result of the invention.

A wide variety of carriers may be used in the preparation of the feed supplement compositions of this invention containing the high potency drug concentrates of sulfamethazine and a tetracycline antibiotic. Carriers suitable for use in combining with the drug concentrates to make up the feed supplement compositions include the following: soybean meal, alfalfa meal, cotton seed oil meal, linseed oil meal, cornmeal, cane molasses, urea, bone meal, corncob meal, and the like. The carrier promotes a uniform distribution of the drug concentrates in the finished feed with which the supplement is blended. It thus performs an important function by ensuring proper distribution of the potent drug concentrates throughout the feed.

As pointed out above, the proportions of the drug concentrates can be varied within fairly wide limits in the carrier, because the amount of active drug in the complete feed can be adjusted by blending the appropriate portion of the feed supplement with the final feed to achieve the desired drug dosage. The drugs are often prepared and sold in a concentrated form, or "premix." The premix is then blended by a feed manufacturer with other ingredients, particularly protein base carriers, to produce feed supplements or concentrated feeds of lower potency. The drug content in these feed supplements should be from about 175 mg./lb. to about 5600 mg./lb. depending upon the amount of supplement to be used in the final feed. To compensate for losses that may be caused by mechanical and human handling or in sampling and assay procedures during manufacture of feed supplements, it is customary to include a slight overage in the quantity of drugs in the premix used to make up the feed supplement.

A particularly useful feed supplement composition can be provided by blending approximately 350 mg. of sulfamethazine and approximately 350 mg. of a tetracycline antibiotic with 1 lb. of supplement. Each drug is thus present in the feed supplement composition in a ratio of approximately 350 mg./lb. of supplement, and the desired dosage of approximately 350 mg. of each drug can be administered to each animal by top dressing its complete feed with 1 lb. of supplement each day. Other dietary supplements, such as, vitamins, minerals, and edible fats and oils, may be added to the medicated feed supplement compositions as appropriate.

After the drugs have been blended by the feed manufacturer with protein base carriers, such as, alfalfa meal, to produce feed supplement compositions, the supplements are then suitable for direct feeding to the animals. The feeding is generally accomplished by top dressing the animals' usual diet of roughage, such as, hay, silage, ground corncobs, or the like, with the medicated feed supplement composition.

Of course, the concentrates can also be added directly to animal feeds containing the necessary roughage to produce a nutritionally balanced, complete feed, so long as the amount of drug introduced into each animal's daily ration remains approximately 350 mg. each of sulfamethazine and a tetracycline antibiotic. The complete feed for ruminants should also contain protein, fat, fiber, carbohydrates, vitamins, and minerals, each in an amount appropriate to meet the nutritional requirements of the animal for which the feed is intended. Most of these substances are present in naturally occurring feed materials, such as, alfalfa meal, corn meal, oats, ground corncobs, soybean meal, wheat bran, and cane molasses. Frequently, iodized salt, bone meal, trace minerals, and urea are added to furnish needed minerals and additional nitrogen.

For a clearer understanding of the invention, specific examples of it are set forth below. These examples are merely illustrative, and are not to be understood as limiting the scope and underlying principles of the invention in any way.

EXAMPLE 1

To determine the efficacy of tetracycline-type antibiotics alone and in combination with sulfamethazine in controlling disease outbreaks in ruminant animals following periods of stress imposed by shipping, handling, and other major problems in the ruminant animals industry, eighty (80) calves (averaging 400 lbs.) were employed in an experiment with two replications. Two (2) levels of chlortetracycline (0 and 350 mg./head/day), and four (4) levels of sulfamethazine (0, 350, 700, and 1400 mg./head/day) were tested.

The calves used in test were purchased from a cattle dealer and shipped by rail to the test site. Shipping time amounted to seven (7) days during which time the cattle were exposed to a sale barn, railroad feeding station, and public stockyards. Upon arrival they were held overnight in open outside pens before being ear tagged and individually weighed. The calves were then individually allotted to pens and treatments for the twenty-eight (28) day experiment.

On the night prior to initiation of the test, the calves were permitted no feed or water. In the morning they were vaccinated with a modified live virus vaccine for prevention of infectious bovine rhinotracheitis and bovine virus diarrhea. During the test the calves were fed a basal ration ad libitum which was top dressed with 2 lbs. of the drug containing protein supplement. The supplement was fed each day which assured the proper dosage of drugs and the calves were observed each day by an experienced cattleman and at frequent intervals by a veterinarian to determine the health status of each test animal. Prior to initiation of the test, the decision was made that where clinical illness was detected, the calf would receive treatment only in the event of imminent death. Final weights were obtained for each animal after withholding water and feed for sixteen (16) hours.

From the results of the data obtained in this test and provided in Table I below, it is dramatically demonstrated that cattle fed two (2) pounds of protein supplement providing each calf with 350 mg./head/day of chlortetracycline and 350 mg./head/day of sulfamethazine were least adversely affected of any treatment group by stresses imposed by shipping and handling. This is evident from significantly higher average final weight of the group and from the outstanding average daily gain and average total gain of the group. Importantly, it is also noted that such gains were achieved with a maximum of feed efficiency as demonstrated by the feed per pound gain reported in Table I below. On a drug weight per ton of supplement basis, the above treatment is equivalent to 350 g./ton of each of the above-mentioned drugs.

The composition of the feed supplement employed in this example was as follows and included 17% crude protein.

Ingredient:
Soybean meal (44% crude protein) percent__ 25
Corn meal _____do____ 70
Molasses (liquid) _____do____ 5
Vitamin A _____I.U./lb__ 5000

The composition of the basal ration employed in this example was as follows.

Composition of basal ration
Ingredient: Percent
Cracked corn _____ 25
Soybean meal (44% crude protein) _____ 15
Dehydrated alfalfa meal _____ 10
Molasses _____ 5
Ground corncobs _____ 45

TABLE I.—THE EFFECT OF CTC* AND SULFAMETHAZINE COMBINATIONS IN FEED ON THE PERFORMANCE OF LIGHTWEIGHT FEEDER CALVES

| Treatment Group | A | B | C | D | E | F | G | H |
| --- | --- | --- | --- | --- | --- | --- | --- | --- |
| CTC, mg./hd./day | 0 | 0 | 0 | 0 | 350 | 350 | 350 | 350 |
| Sulfamethazine, mg./hd./day | 0 | 350 | 700 | 1,400 | 0 | 350 | 700 | 1,400 |
| Number of Calves | 10 | 10 | 10 | 10 | 10 | 10 | 10 | 10 |
| Number Days on Test | 28 | 28 | 28 | 28 | 28 | 28 | 28 | 28 |
| Avg. Int. Wt. (lbs.) | 378.5 | 382.0 | 376.5 | 374.0 | 374.5 | 383.5 | 385.5 | 381.5 |
| Avg. Final Wt. (lbs.) | 456.0 | 455.5 | 461.0 | 453.5 | 453.5 | 472.0 | 464.5 | 458.0 |
| Avg. Total Gain (lbs.) | 77.5 | 73.5 | 84.5 | 79.5 | 79.5 | 88.5 | 79.0 | 76.5 |
| Avg. Daily Gain (lbs.) | 2.77 | 2.63 | 3.02 | 2.84 | 2.82 | 3.16 | 2.82 | 2.73 |
| Avg. Daily Ration: | | | | | | | | |
| Basal Mix (lbs.) | 12.3 | 12.2 | 12.7 | 12.0 | 11.8 | 12.8 | 11.1 | 11.2 |
| Supplement (lbs.) | 2.0 | 2.0 | 2.0 | 2.0 | 2.0 | 2.0 | 2.0 | 2.0 |
| Total (lbs.) | 14.3 | 14.2 | 14.7 | 14.0 | 13.8 | 14.8 | 13.1 | 13.2 |
| Feed/lb. Gain | 5.8 | 5.41 | 4.88 | 4.94 | 4.90 | 4.71 | 4.65 | 4.84 |

* Chlortetracycline.

EXAMPLE 2

Further demonstration of the stress relieving effects produced by the administration of a tetracycline-type antibiotic, particularly chlortetracycline, in combination with sulfamethazine, administered in a high energy or high protein concentrate at the level of approximately 350 mg./head/day of each of said drugs is shown by the following test.

In this test eighty (80) weanling calves (average weight 325 lbs.) were employed in an experiment with two (2) replications, steers and heifers. Chlortetracycline and sulfamethazine alone and in combination were administered to cattle previously subjected to stresses involved in their handling and shipping. The drugs were administered at graded levels in a high protein concentrate as a top dressing to the normal feed. The cattle were purchased from a cattle dealer and shipped to the site of the experiment by means of cattle trucks. Shipping time was approximately eighteen (18) hours and following arrival at the experimental site the cattle were placed in dry outside pens for twenty-four (24) hours. They were then tagged and individually weighed and allotted to pens and treatments.

The calves were divided into two (2) groups, heifers (replicate I), and steers (replicate II). The experiments were conducted in the same manner as previously described in Example 1 and the data obtained are provided in Table II below. These data support the findings of the previous experiment and clearly show the significant response of the animals to the stress relieving combination of drugs provided by means of the concentrate administered in the test.

TABLE II.—THE EFFECT OF CTC* AND SULFAMETHAZINE COMBINATIONS IN FEED ON THE PERFORMANCE OF LIGHTWEIGHT FEEDER CALVES

| Treatment Group | A | B | C | D | E | F | G | H |
| --- | --- | --- | --- | --- | --- | --- | --- | --- |
| CTC, mg./head/day | 0 | 0 | 0 | 0 | 350 | 350 | 350 | 350 |
| Sulfamethazine, mg./head/day | 0 | 350 | 700 | 1,400 | 0 | 350 | 700 | 1,400 |
| Number of Calves | 10 | 10 | 10 | 10 | 10 | 10 | 10 | 10 |
| Number of Days on Test | 28 | 28 | 28 | 28 | 28 | 28 | 28 | 28 |
| Avg. Initial Wt., lb | 327 | 322 | 322 | 324 | 320 | 330 | 320 | 324 |
| Avg. Final Wt., lb | 383 | 370 | 394 | 387 | 380 | 401 | 386 | 393 |
| Avg. Total Gain, lb | 56.0 | 48.0 | 71.5 | 63.0 | 60.0 | 71.0 | 65.0 | 69.0 |
| Avg. Daily Gain, lb | 2.00 | 1.71 | 2.55 | 2.25 | 2.14 | 2.54 | 2.32 | 2.46 |
| Avg. Daily Ration: | | | | | | | | |
| Basal Mix, lb | 7.1 | 7.0 | 8.0 | 8.0 | 7.4 | 8.0 | 8.1 | 8.0 |
| Supplement, lb | 2.0 | 2.0 | 2.0 | 2.0 | 2.0 | 2.0 | 2.0 | 2.0 |
| Total, lb | 9.1 | 9.0 | 10.0 | 10.0 | 9.4 | 10.0 | 10.1 | 10.0 |
| Feed/lb. Gain, lb | 4.55 | 5.26 | 3.89 | 4.42 | 4.37 | 3.92 | 4.34 | 4.07 |

*Chlortetracycline.

It will be noted that the results of Example 2, as shown in Table II, produced slightly higher average total gains, average daily gains, and slightly better feeding efficiencies for a dosage of 700 mg./head/day of sulfamethazine (Treatment Group C) over the dosages of the present invention of approximately 350 mg./head/day each of sulfamethazine and a tetracycline antibiotic (Treatment Group F). Because of this indicated minor improvement in Table II of the 700 mg./head/day sulfamethazine (Treatment Group C) over the invention (Treatment Group F), it was decided to statistically analyze the data in both Tables I and II and to make up a combined Table III showing the overall results of the data from both Examples 1 and 2.

Accordingly, Dunnett's method of comparing all means with a control, as reported in the Journal of the American Statistical Association, 50:1096–1121, 1955, was used to determine the statistical significance of the combined results of Tables I and II, as shown in Table III.

This statistical analysis is set forth below and is followed by the combined results shown in Table III.

STATISTICAL ANALYSIS OF WEIGHT GAIN DATA
[Pounds/head for 28-day period]

| Source of Variation | d.f. | S.S. | M.S. |
|---|---|---|---|
| Treatment (T) | 7 | 5,082 | [3] 726 |
| Chlortetracycline (C) | (1) | 744 | [1] 744 |
| Sulfamethazine (S) | (3) | 1,014 | 338 |
| Control vs. S | /1/ | 553 | 553 |
| Linear | /1/ | 61 | 61 |
| Quadratic | /1/ | 400 | 400 |
| C×S | (3) | 3,324 | [3] 1,108 |
| C×Control vs. S | /1/ | 33 | 33 |
| C×Linear | /1/ | 1,531 | [2] 1,531 |
| C×Quadratic | /1/ | 1,760 | [3] 1,760 |
| Experiment (E) | 1 | 11,306 | [3] 11,306 |
| E×T | 7 | 1,061 | 152 |
| Replication | 1 | 1,129 | 1,129 |
| Outcome Groups | 4 | 6,174 | [3] 1,544 |
| Error | 139 | 34,752 | 250 |

[1] $P<.10$.
[2] $P<.05$.
[3] $P<.01$.
d.f.—degrees of freedom.
S.S.—sums of squares.
M.S.—mean square.
Standard Error for single observation—15.8 lb.
Coefficient of variation—22%.

bined dosage of approximately 350 mg./head/day each of sulfamethazine and a tetracycline antibiotic, over either of these drugs used singly or the use of the closest control groups in the previous examples (namely, Treatment Group C, with a dosage of 700 mg./head/day of sulfamethazine), it was decided to conduct additional tests. In these tests four (4) treatment groups were used with each group employing fifteen (15) steer calves having an average weight of approximately 350 pounds. Treatment Group A was used as a control and no drugs were administered to the calves in this group.

The calves in Treatment Group B were administered the feed supplement composition of this invention, i.e., a feed supplement containing approximately 350 mg./head/day each of sulfamethazine and chlortetracycline. The calves of Treatment Group C were given a feed supplement containing 700 mg./head/day of sulfamethazine and *no* tetracycline antibiotic, and the calves of Treatment Group D were given a feed supplement containing 700 mg. of chlortetracycline and *no* sulfamethazine.

The pre-experiment management of the cattle used in Example 3 was intended to parallel as closely as possible the practical procedures used in shipping and handling of cattle entering feedlots. During the four-week experimental period the effects of the various drug treatments were measured as improvements in performance over the control. Incidents of sickness were recorded along with other clinical observations.

It was known before the experiment began that the erratic nature of shipping fever and other ills affecting cattle subjected to distress conditions would probably not allow convincing differences to be detected in the number of cattle becoming sick or those requiring therapeutic medication. It would be possible, however, to detect the severity of disease condition by observing weight gains and feed efficiency as critical criteria for measuring setbacks encountered during the initial period in the feedlots.

The cattle used in the test were purchased from a cattle dealer and shipped by rail to the feedlots on the test site. The cattle were enroute approximately twenty- TABLE III.—THE EFFECT OF CHLORTETRACYCLINE AND SULFAMETHAZINE COMBINATIONS ON THE PERFORMANCE OF LIGHTWEIGHT FEEDER CALVES

| Treatment Group | A | B | C | D | E | F | G | H |
|---|---|---|---|---|---|---|---|---|
| Chlortetracycline, mg./hd./day | 0 | 0 | 0 | 0 | 350 | 350 | 350 | 350 |
| Sulfamethazine, mg./hd./day | 0 | 350 | 700 | 1,400 | 0 | 350 | 700 | 1,400 |
| Number of Calves | 20 | 20 | 20 | 20 | 20 | 20 | 20 | 20 |
| Number of Days on Test | 28 | 28 | 28 | 28 | 28 | 28 | 28 | 28 |
| Average Initial Weight, lb | 352.8 | 352.2 | 349.5 | 349.0 | 347.0 | 356.8 | 353.0 | 352.8 |
| Average Final Weight, lb | 419.5 | 413.0 | 427.5 | 420.2 | 416.5 | 436.5 | 425.0 | 425.5 |
| Average Total Gain, lb | 66.7 | 60.8 | 78.0 | 71.2 | 69.5 | 79.7 | 72.0 | 72.7 |
| Average Daily Gain, lb | 2.38 | 2.17 | 2.79 | 2.54 | 2.48 | [a] 2.85 | 2.57 | 2.60 |
| Average Daily Ration, lb.: | | | | | | | | |
| Basal Mix | 9.7 | 9.6 | 10.3 | 10.0 | 9.6 | 10.4 | 9.6 | 9.6 |
| Supplement | 2.0 | 2.0 | 2.0 | 2.0 | 2.0 | 2.0 | 2.0 | 2.0 |
| Total | 11.7 | 11.6 | 12.3 | 12.0 | 11.6 | 12.4 | 11.6 | 11.6 |
| Feed Required/lb. Gain, lb | 4.89 | 5.47 | 4.39 | 4.68 | 4.65 | 4.32 | 4.50 | 4.46 |
| Number Requiring Therapy [b] | 1 | 0 | 0 | 0 | 0 | 2 | 1 | 0 | 0 |

[a] Significantly greater than control (Probability $<.05$). Dunnett's method of comparing all means with a control (J. Am. Stat. Assoc. 50:1096-1121, 1955).
[b] Procaine penicillin and dihydrostreptomycin injectable.

On the basis of this statistical analysis, it is apparent that the only treatment group detected as being significantly improved over the controls with respect to weight gains is Group F which received the combination of this invention, or approximately 350 mg./head/day of chlortetracycline and approximately 350 mg./head/day of sulfamethazine.

EXAMPLE 3

To further confirm the results of this statistical analysis in Table III and demonstrate the superiority of the comfour (24) hours. Upon arrival at the feed yard, the cattle were unloaded, individually identified, and weighed before being fed and watered. They were each vaccinated with *Leptospira pomona* bacterin and infectious bovine rhinotracheitis vaccine.

The sixty (60) steer calves used in this experiment were randomly allotted to pens and treatments. The pens were identical inside pens with free access to feed and water.

Empty body weights were recorded for each animal upon initiation of the experiment. The cattle were weighed as soon as possible after arrival before feed and water were offered, and after an overnight stand off feed and water at termination. The cattle were held off feed and water for sixteen (16) hours before taking their termination weights.

Throughout the experiment the cattle were observed daily by an experienced cattleman to determine their health status. A licensed veterinarian also examined the cattle, administered any treatment deemed necessary, and made a diagnosis when possible. Records of feed consumption, body weight gains, morbidity, and mortality were maintained. Only one (1) calf was treated for pasteurellosis during the course of the experiments, indicating a relatively mild disease challenge.

During the test the calves were fed a basal ration ad libitum which was top dressed with two (2) pounds of the drug-containing protein supplement, and the supplement was fed each day during the twenty-eight (28) day test period.

The composition of the basal ration employed in this example was as follows.

| Ingredient: | Percent |
|---|---|
| Sun-cured alfalfa pellets | 30 |
| Cottonseed hulls | 20 |
| Corn (dry-rolled) | 50 |
| | 100 |

The composition of the feed supplement employed in this example was as follows.

Composition of protein supplement [1]

| Ingredient/1,000 lb.: | Lbs. |
|---|---|
| Soybean meal, 44% | 500 |
| Corn meal | 195 |
| Urea, 281% | 25 |
| Cane molasses (liquid) | 70 |
| Dehydrated alfalfa meal, 17% | 140 |
| Dicalcium phosphate | 52 |
| Salt, iodized | 18 |
| Micronutrients [2] | — |
| Total | 1,000 |

[1] The protein supplement was fed at the rate of 2 lbs./head/day. Each two (2) lbs. of supplement carried the appropriate dosage of antibacterials.
[2] See the following table:

| Cobalt carbonate | gm | 2 |
|---|---|---|
| Zinc oxide | gm | 625 |
| Vitamin A | million I.U. | 10 |
| Vitamin D | do | 1.5 |

The results of the data obtained in this test are set forth in Table IV below:

TABLE IV.—THE EFFECT OF CTC,* SULFAMETHAZINE, AND A COMBINATION OF CTC AND SULFAMETHAZINE ADMINISTERED AT EQUIVALENT FEED DOSAGES IN STARTER RATIONS FOR FEEDER CATTLE

| Treatment Groups | A | B | C | D |
|---|---|---|---|---|
| CTC, mg./hd./day | 0 | 350 | 0 | 700 |
| Sulfamethazine, mg./hd./day | 0 | 350 | 700 | 0 |
| Number of Animals | 15 | 15 | 15 | 15 |
| Number of Days on Test | 28 | 28 | 28 | 28 |
| Average Initial Weight (lbs.) | 352.3 | 333.6 | 348.6 | 351.7 |
| Average Final Weight (lbs.) | 411.0 | 408.3 | 411.3 | 411.0 |
| Average Total Gain (lbs.) | 58.7 | 74.7 | 62.7 | 59.3 |
| Average Daily Gain (lbs.) | 2.10 | 2.67 | 2.24 | 2.12 |
| Average Daily Ration (lbs.) | 14.24 | 13.56 | 14.04 | 14.65 |
| Feed Required/lb. Gain (lbs.) | 6.78 | 5.08 | 6.27 | 6.91 |
| Cattle Requiring Treatment | 0 | 0 | 0 | 1 |
| Cattle Requiring Retreatment | 0 | 0 | 0 | 0 |
| Total Treatments | 0 | 0 | 0 | 1 |
| Mortalities | 0 | 0 | 0 | 0 |

* Chlortetracycline.

The results set forth in Table IV dramatically demonstrate that the cattle fed two (2) lbs. of protein supplement giving each calf approximately 350 mg./head/day of chlortetracycline and approximately 350 mg./head/day of sulfamethazine were least adversely affected of any treatment group by stresses imposed by shipping and handling. Thus, Treatment Group B, which incorporates the present invention, showed distinctly superior results to any of the other treatment groups, and this is evident from the significantly higher average final weight, average total gain, and average daily gain of this group over the others. Also, the feed efficiency of Treatment Group B was clearly superior to the feed efficiency of the other groups. In figures, Treatment Group B showed improved weight gains of 27% over the controls and an improved feed efficiency of 25% over the controls.

The experimental results of this example thus clearly establish that the combined dosage of approximately 350 mg./head/day each of sulfamethazine and chlortetracycline yield distinctly superior results to equivalent feed dosages of 700 mg./head/day of sulfamethazine alone or 700 mg./head/day of chlortetracycline alone.

To make clear the superiority of the present invention over a feed dosage of 700 mg./head/day of sulfamethazine alone, the experimental results of Examples 1, 2 and 3 have all been statistically combined into one table setting forth the results of the treatments that were common to all three (3) experiments. This summary of the results of all three (3) experiments appears in Table V below:

TABLE V

| | Control | 350/350 CTC*+ Sulfamethazine | 700 Sulfamethazine |
|---|---|---|---|
| Number Animals | 35 | 35 | 35 |
| Avg. Total Gain: | | | |
| Table I | 77.5 | 88.5 | 84.5 |
| Table II | 56.0 | 71.0 | 71.5 |
| Table IV | 58.7 | 74.7 | 62.7 |
| Total | 192.2 | 234.2 | 218.7 |
| Average | 64.06 | [1] 78.06 | [2] 72.9 |
| Avg. Daily Gain: | | | |
| Table I | 2.77 | 3.16 | 3.02 |
| Table II | 2.00 | 2.54 | 2.55 |
| Table IV | 2.10 | 2.67 | 2.24 |
| Total | 6.87 | 8.37 | 7.81 |
| Average | 2.29 | 2.79 | 2.60 |
| Feed/Lb. Gain: | | | |
| Table I | 5.8 | 4.71 | 4.88 |
| Table II | 4.55 | 3.92 | 3.89 |
| Table IV | 6.78 | 5.08 | 6.27 |
| Total | 17.13 | 13.71 | 15.04 |
| Average | 5.71 | [3] 4.57 | [4] 5.01 |

[1] 21.8% improvement over control.
[2] 13.8% improvement over control.
[3] 20.1% improvement in feed efficiency.
[4] 12.1% improvement in feed efficiency.
* Chlortetracycline.

This compilation of the results of three (3) experiments, Examples 1, 2, and 3, again clearly brings out the superiority of the present invention over the controls and the feed dosage of 700 mg./head/day of sulfamethazine, which aside from the present invention, produced the best results of the various feed dosages compared with the dosage of the invention.

EXAMPLE 4

Following the procedure set forth in Example 1 but substituting oxytetracycline, tetracycline, or demethylchlortetracycline for chlortetracycline in the sulfamethazine containing supplement results in similar stress relief of the treated animals. Other basic feed supplements that may be used satisfactorily in the practice of this invention are set forth below:

17% crude protein supplement

Dehydrated alfalfa meal (17% crude protein).—A small amount of edible fat or oil may be added to prevent dusting. Also Vitamins A and D may be added if desired. 160,000 U.S.P. units per pound of each has been employed satisfactorily.

32% crude protein supplement

| | Lbs. |
|---|---|
| Soybean meal (44% crude protein) | 650 |
| Cane molasses | 140 |
| Dehydrated alfalfa meal (17%) | 140 |
| Bone meal | 52 |
| Iodized salt | 18 |
| Total | 1000 |

64% crude protein supplement

| | Lbs. |
|---|---|
| Cane molasses | 280 |
| Dehydrated alfalfa meal (17%) | 360 |
| Urea | 221 |
| Bone meal | 104 |
| Iodized salt | 35 |
| Total | 1000 |

Preparation of the medicated supplement is readily accomplished by thoroughly mixing from 350 g./ton to 11,200 g./ton of one of the tetracycline antibiotics above and from about 350 g./ton to 11,200 g./ton of sulfamethazine with the selected supplement. Where desired, the supplement containing the drugs may be pelletized for convenience of handling or appearance sake. In practice, the supplements containing the drugs are administered at the rate of from about 1/16 lb. to 2 lb./head/day.

What is claimed is:

1. A method for promoting growth and controlling the outbreak of disease in ruminant animals comprising administering to said animals a feed supplement composition comprising, together with edible animal feedstuffs, sulfamethazine, and a tetracycline antibiotic selected from the group consisting of tetracycline, chlortetracycline, oxytetracycline, and demethylchlortetracycline; said supplement composition being administered to the ruminant animals in an amount sufficient to furnish approximately 350 mg./head/day of said sulfamethazine and approximately 350 mg./head/day of said tetracycline antibiotic.

2. The invention as defined in claim 1, in which the tetracycline antibiotic is chlortetracycline.

References Cited
UNITED STATES PATENTS 3,185,573  5/1965  Harvey _____ 99—2

ALBERT T. MEYERS, Primary Examiner

STANLEY J. FRIEDMAN, Assistant Examiner